United States Patent [19]

Kimura et al.

[11] Patent Number: 4,521,788

[45] Date of Patent: Jun. 4, 1985

[54] INK JET PRINTING HEAD

[75] Inventors: Yoshiaki Kimura, Hachioji; Taketo Nozu, Hino; Yasuhiko Tanaka, Fuchu, all of Japan

[73] Assignee: Konishiroku Photo Industry Co., Ltd., Japan

[21] Appl. No.: 452,097

[22] Filed: Dec. 22, 1982

[30] Foreign Application Priority Data

Dec. 26, 1981 [JP] Japan ............................... 56-213901

[51] Int. Cl.$^{3}$ ............................................ G01D 15/18

[52] U.S. Cl. ................................................ 346/140 R

[58] Field of Search .............................. 346/75, 140 R

[56] References Cited

U.S. PATENT DOCUMENTS

| | | | |
|---|---|---|---|
| 3,747,120 | 7/1973 | Stemme | 346/75 |
| 4,293,865 | 10/1981 | Tinnai et al. | 346/140 R |
| 4,339,763 | 7/1982 | Kyser et al. | 346/140 R |
| 4,367,480 | 1/1983 | Kotoh | 346/140 R |
| 4,376,284 | 3/1983 | Bader et al. | 346/140 R |
| 4,389,658 | 6/1983 | Perna et al. | 346/140 R |

FOREIGN PATENT DOCUMENTS

| | | | |
|---|---|---|---|
| 5101466 | 8/1980 | Japan | 346/140 R |

*Primary Examiner*—E. A. Goldberg
*Assistant Examiner*—Gerald E. Preston
*Attorney, Agent, or Firm*—Finnegan, Henderson, Farabow, Garrett & Dunner

[57] ABSTRACT

A printing head for an impulse jet type ink-jet printing apparatus which includes a plurality of nozzles supplied with ink from a common ink chamber through ink flow channels and pressure chambers which are substantially perpendicular to the nozzles. Piezoelectric-crystal elements are disposed in each pressure chamber and have a length to width ratio not less than 2 to 1 and not greater than 20 to 1.

7 Claims, 9 Drawing Figures

INK JET PRINTING HEAD

BACKGROUND OF THE INVENTION

The present invention relates to demand type printing heads for ink-jet printing apparatus, and more particularly to an improvement wherein the printing nozzles associated therewith mounted closely together in the printing head.

Heretofore, several types of printing heads for ink-jet printing apparatus have been employed. One typical version is diagramatically illustrated in FIG. 1 wherein ink is supplied from a reservoir 1 by way of a conduit to a common ink-chamber 3 formed in a printing head 2. Ink flow channels 4 connect the common ink chamber 3 to a respective one of a plurality of nozzles 6 via pressure chambers each of which contains a piezoelectric-crystal element 5 driven by driving circuit 9. The channels 4 correspond to the elements of an image pattern.

In a printing operation, the piezoelectric-crystal elements 5 mounted in the pressure chambers are activated by electric signals which correspond to image pattern signals and ink is pressurized causing ink-droplets to be ejected through nozzles 6.

A feature of the above described demand type printing unit is that it does not require a system for recovering unused ink because ink is ejected only when necessary and in response to an image pattern signal so that ink consumption is minimized.

Furthermore, these demand printing devices enjoy excellent reliability and can be made relatively small and light weight, and correspondingly low in cost. Still further, a number of channels may easily be provided on a single printing head, so that high resolution and high speed printing may be carried out and color printing is possible.

In these prior art devices such as is illustrated in FIG. 1, the nozzles 6, ink flow channels 4, and pressure chambers containing the piezoelectric-crystal elements 5 generally all face the same direction as shown in FIG. 1. There have been many attempts to devise various mountings for multi-nozzles in a single head. One type employes ink flow channels and pressure chambers on both sides of a single printing head and provides up to 24 to 32 nozzles.

Problems arise, however, for the reason that it is difficult to mount a significantly larger number of nozzles on a single printing head of given size, because it would require smaller ink flow channels and pressure chambers, and even smaller nozzles.

SUMMARY OF THE INVENTION

It is an object of the invention to provide a printing head which is superior to the conventional demand type printing heads and which easily can be provided with a large number of nozzles.

Another object of the present invention is to provide a demand type printing head including a large number of nozzles, each of which is substantially identical in performance with regard to ejection of ink.

A further object of the invention is to provide a unitary demand-type printing head which has high resolution and is capable of printing in color.

The invention is achieved by providing ink flow channels and pressure chambers which are connected to respective ones of the nozzles and which are arranged orthogonally and radially to the direction of the nozzles. This is distinguished from a construction such as described above wherein the ink flow channels and pressure chambers are arranged on one side of and facing the nozzles.

Another feature of the invention is that the ink flow channels and the pressure chambers may be arranged even closer to one another by improving the configuration of piezoelectric-crystal elements which are positioned in the pressure chambers.

Still another feature of the invention is that the piezoelectric-crystal elements are arranged radially at an angle of not less than 180 degrees.

DETAILED DESCRIPTION

Figure 1:
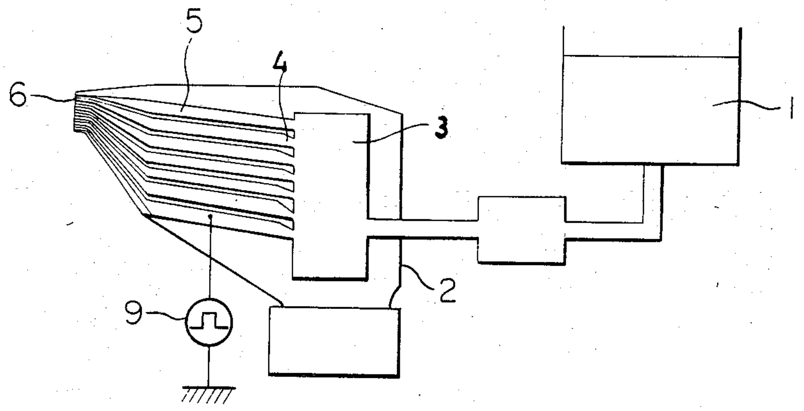
FIG. 1 PRIOR ART
FIG. 1 is a schematic view illustrating a conventional demand-type printing head.
Figure 2:
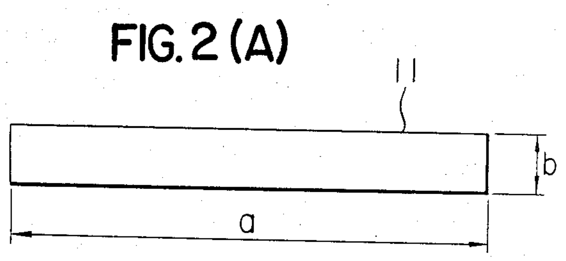
FIGS. 2(A) and 2(B) are views showing forms of piezoelectric-crystal elements constructed according to the present invention.
Figure 2:
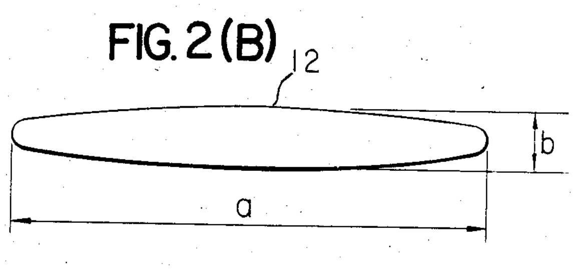

Referring now more particularly to the drawings, FIG. 2 illustrates the desired relation between the length a and the width b of a rectangular shaped piezoelectric-crystal element constructed according to the present invention. The preferred relationship between these dimensions is as follows:

$$2b \leqq a \leqq 20b$$

A piezoelectric-crystal element according to the above formula is not to be limited to those having a rectangular configuration as shown at FIG. 11 in FIG. 2(A), but also may be elliptical as shown at 12 in FIG. 2(B). In this case, the longitudinal dimension or maximum diameter is designated a and the width or diameter perpendicular to the length is designated b.

Figure 3:
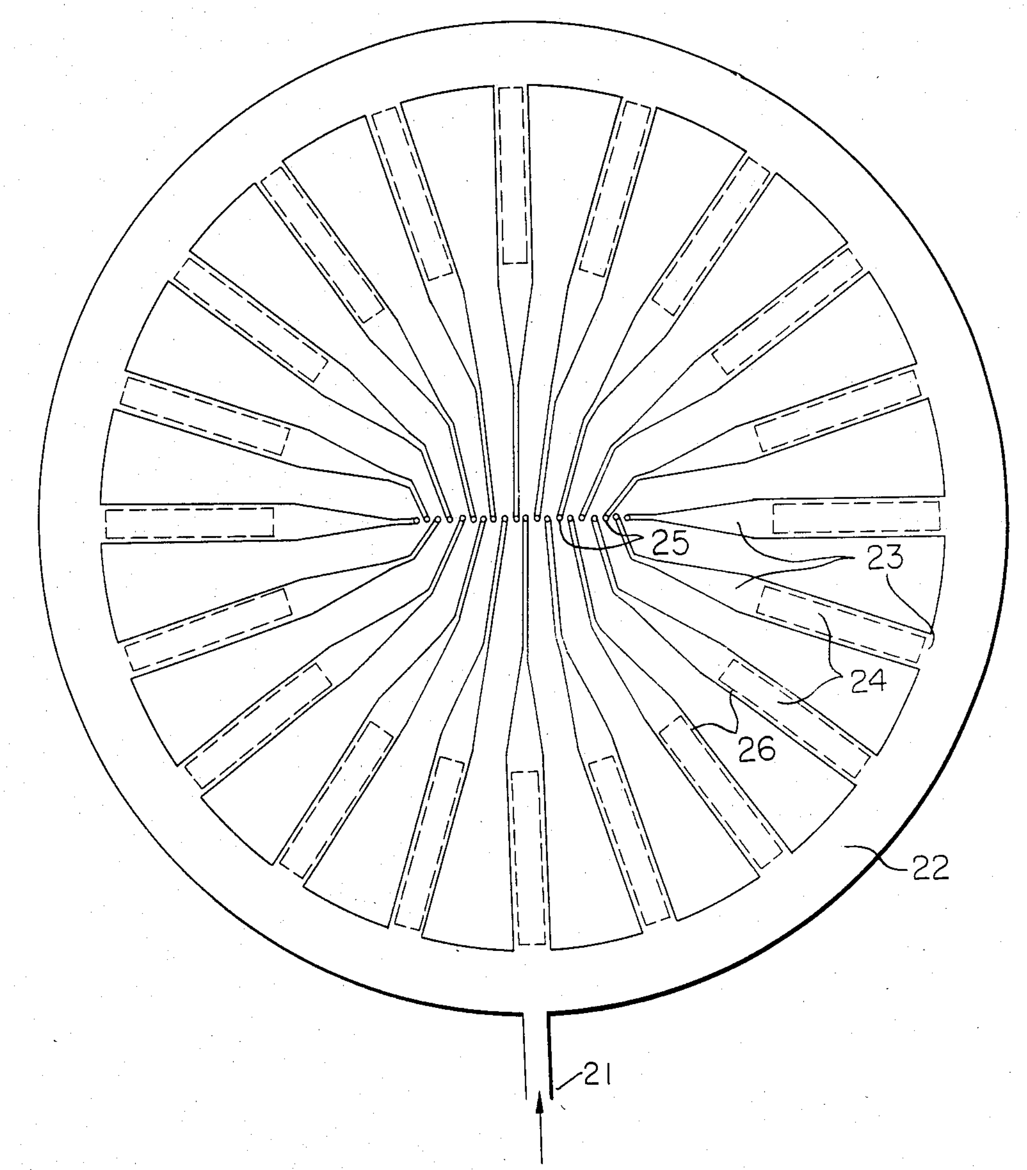
FIG. 3 is a view showing a demand-type printing head embodying the present invention.
Figure 4:
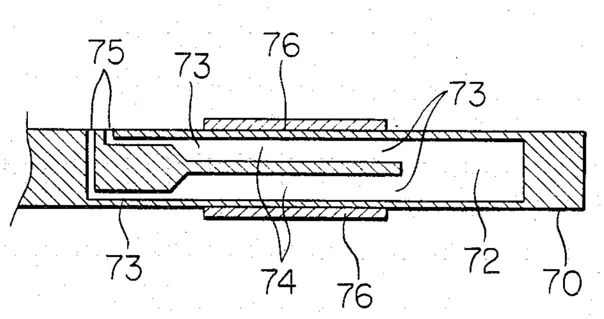
FIG. 4 is a sectional view showing a printing head having a high density of nozzles.

FIG. 3 illustrates a printing head in accordance with the invention, wherein ink supplied from an ink-reservoir (not shown) enters an arcuately-shaped common ink-chamber 22 through an induction pipe or conduit 21. The common ink-chamber 22 is radial of an surrounds a plurality of nozzles 25 and is substantially perpendicular to the direction of the nozzles. A plurality of ink flow channels 23 and pressure chambers 24 are disposed radially inwardly from the inner circumference the nozzles 25. The nozzles 25 are arranged approximately perpendicularly to the ink flow channels 23 and pressure chambers 24 and may face either direction. Thus chamber 22, channels 23 and chambers 24 are all disposed substantially parallel to the same reference plane. A piezoelectric-crystal element 26 is positioned in each pressure chamber 24 and the configuration of the piezoelectric-crystal elements is in accordance with the formula discussed above, i.e., a length to width ratio of not less than 2 to 1 and not greater than 20 to 1. By this construction, it is possible to greatly reduce the width of the pressure chambers 24 while the length thereof can be extended. It also becomes possible to arrange a large number of ink flow channels 23 in the limited circumferential area of each nozzle 25, as compared with a construction using a circular piezoelectric-crystal element. FIG. 4 shows another example of the invention in which a high density of nozzles 75 are connected to ink flow channels 73 arranged on both surfaces of a printing head 70 having a common ink chamber 72 and piezoelectric-crystal elements 76.

Figure 5:
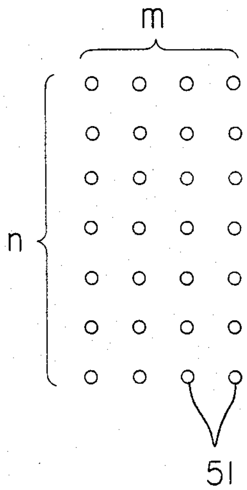
FIGS. 5(A) and 5(B) are schematic views showing different arrangements of nozzle openings.
Figure 5:
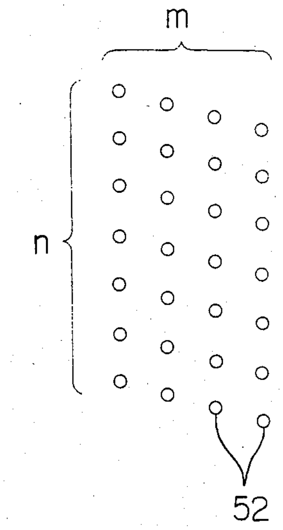

The alternating manner in which each nozzle 25 is connected to its respective ink flow channel 23 shown in FIG. 3 enhances the allowed density of ink flow channels. It will be appreciated, however, that the nozzles 25 need not always be limited to arrangement in a single row or in a straight line. For example, FIG. 5(A) shows nozzles 51 arranged in a matrix of lines of nozzles n in rows m. FIG. 5(B) shows the matrix of nozzles slanted so that the nozzles in each row are disposed intermediate the nozzles of the next adjacent row. With the arrangement shown in FIG. 5(B), a high image pattern density may be obtained because the distance between the nozzles remains wide. In addition, manufacturing of the printing head which employs this pattern is easier and a highly dense printing operation may be performed. In the nozzle arrangements shown in both FIGS. 5(A) and 5(B), it is possible to record highly dense color image patterns by making each row of nozzles correspond to different colors such as yellow, magenta, cyan, black, etc.

Figure 6:
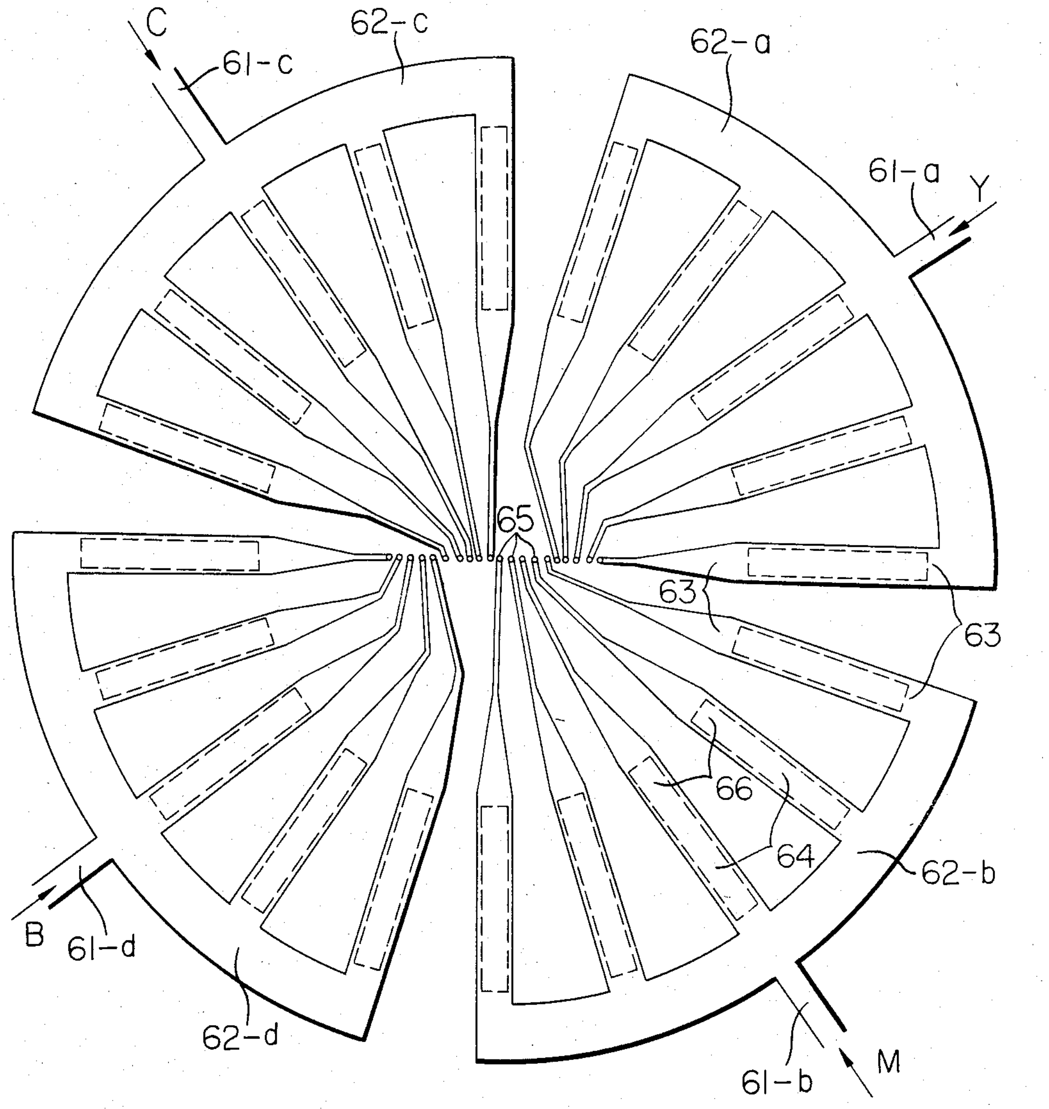
FIG. 6 is a view similar to FIG. 3 and showing a modified form of printing head.

FIG. 6 shows a further example of printing apparatus of the present invention. In this embodiment, the common ink chamber 22 of FIG. 3 is divided into several segments such as *62a*, *62b*, *62c*, and *62d*, which are supplied with ink of different colors through separate induction pipes *61a*, *61b*, *61c* and *61d*, which correspond in number to the number of colors which can be utilized. In the example of FIG. 6, the ink induction pipes and the common ink chambers are divided into four segments a, b, c, and d, which correspond to the four colors yellow, magenta, cyan and black. Further, induction pipes and common chambers are connected to nozzles 65 through ink flow channels 63 and pressure chambers 64 containing piezoelectric-crystal elements 66. In the FIG. 6 embodiment, each nozzle 65 is divided into four segments corresponding respectively to each color.

Figure 7:
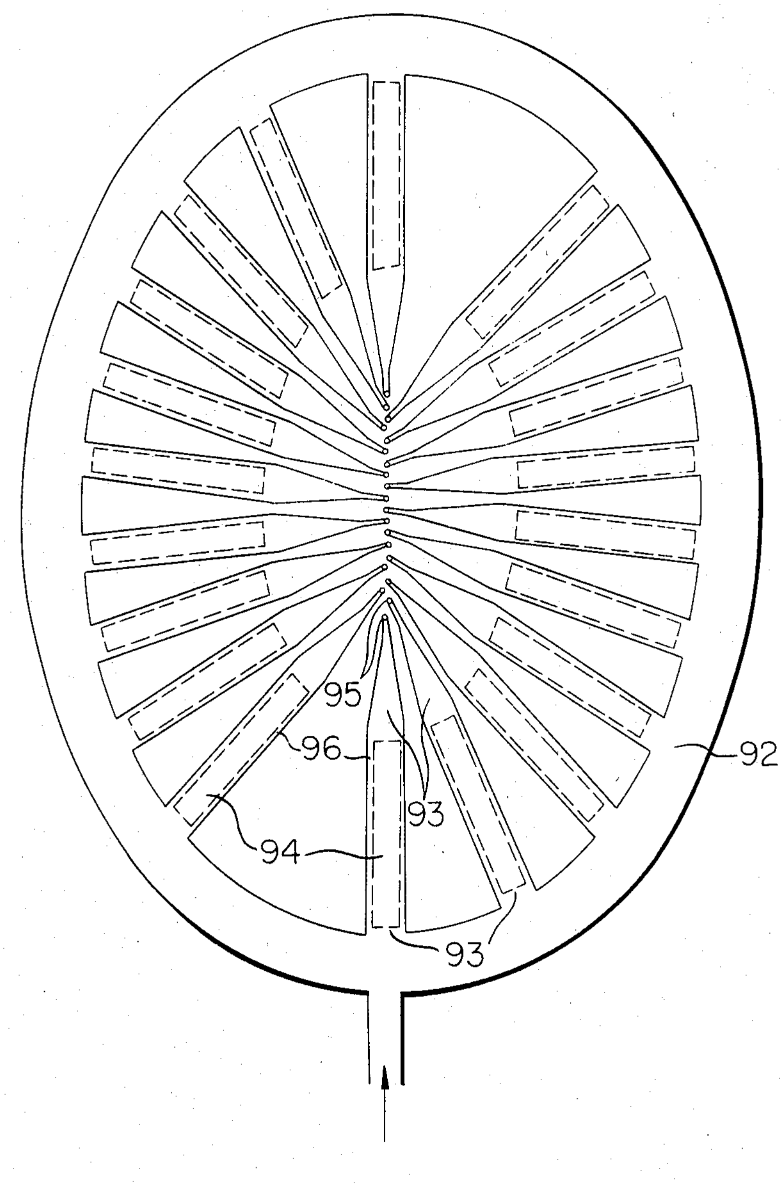
FIG. 7 is a view similar to FIGS. 3 and 6 and showing a still further modified form of printing head.

FIG. 7 shows still another example of a printing head constructed according to the present invention. In this embodiment, as in the embodiment of FIG. 3, the ink flow channels 93 and the pressure chambers 94 containing piezoelectric-crystal elements 96 are nearly identical to each other in configuration and length and connect common ink chamber 92 with nozzles 95.

As a result of the construction of a printing head described herein, it is possible to have nearly identical frequency and driving characteristics for ink droplets ejected from each nozzle. Therefore, the electrical controls required for this device are simplified.

Furthermore, the invention makes it possible to construct a high speed high resolution printing head having 80 to 100 nozzles, and one which has high speed and high resolution in color printing.

It will be appreciated that various additions, substitutions, modifications and omissions may be made to the present invention without departing from the scope or spirit thereof. Therefore, it is intended that this invention encompass those additions, substitutions, modifications and omissions provided they fall within the appended claims and their equivalents.

What is claimed is:

1. An ink-jet printing head for an impulse jet type ink-jet printing apparatus, the printing head comprising:

at least one arcuately-shaped common ink-chamber disposed substantially parallel to a reference plane;

a plurality of ink flow channels connected at one end to said common ink-chamber and extending radially from the inner circumference of said common chamber and substantially parallel to said plane, said common ink-chamber curving toward said ink flow channels and ink being supplied to said ink flow channels from said common ink-chamber;

each of said ink flow channels including (a) a nozzle from which ink is to be ejected dropwise, disposed substantially perpendicularly to said plane and connected to the end of each said ink flow channel opposite to the end connected to said common ink-chamber, (b) a pressure chamber, and (c) a piezoelectric-crystal element disposed on at least one surface of said pressure chamber and having a length to width ratio in the range of not less than 2 to 1 and not greater than 20 to 1.

2. A printing head as claimed in claim 1, wherein said ink flow channels face each other and have a nozzle row interposed therebetween, said channels on opposite sides of said nozzle row being connected to alternate nozzles in said nozzle row.

3. A printing head as claimed in claim 1 or claim 2, including a plurality of arcuately-shaped common ink-chambers disposed to form a closed arc surrounding said nozzles.

4. A printing head as claimed in claim 1 or 2, wherein said nozzles are arranged in a plurality of rows so that the nozzles of each row are disposed intermediate the nozzles of the next adjacent row.

5. A printing head as claimed in claim 4, wherein said nozzles are arranged in a matrix.

6. A printing head as claimed in claim 1 or 2, wherein said ink flow channels and pressure chambers are disposed relative to each other to make the jetting characteristics of droplets from the nozzles substantially equal.

7. A printing head as claimed in claim 6, wherein the lengths of the ink flow channels are substantially equal and serve to make the jetting characteristics of the nozzles substantially equal.

* * * * *